United States Patent [19]

Takeuchi et al.

[11] Patent Number: 5,742,766
[45] Date of Patent: Apr. 21, 1998

[54] PARALLEL COMPUTING SYSTEM FOR SYNCHRONIZING PROCESSORS BY USING PARTIAL SWITCH CIRCUITS FOR BROADCASTING MESSAGES AFTER RECEIVING SYNCHRONIZATION SIGNALS AND JUDGING SYNCHRONIZATION THEREOF

[75] Inventors: Shigeo Takeuchi, Hanno; Hideo Wada, Hadano; Naoki Hamanaka; Junji Nakagoshi, both of Tokyo; Teruo Tanaka, Hachioji; Yasuhiro Ogata, Akishima; Taturu Toba, Kunitachi; Mitsuyoshi Igai, Hino, all of Japan

[73] Assignees: Hitachi, Ltd.; Hitachi VLSI Engineering, Corp., both of Tokyo, Japan

[21] Appl. No.: 34,805

[22] Filed: Mar. 19, 1993

[30] Foreign Application Priority Data

Mar. 19, 1992 [JP] Japan ................................. 4-063065

[51] Int. Cl.⁶ ..................................................... G06F 13/12
[52] U.S. Cl. ..................... 395/200.19; 395/200.02
[58] Field of Search ........................... 395/800, 200.02, 395/200.19, 182.1, 200.03

[56] References Cited

U.S. PATENT DOCUMENTS

| | | | |
|---|---|---|---|
| 4,493,051 | 1/1985 | Brezzo et al. | 395/550 |
| 4,925,311 | 5/1990 | Neches et al. | 395/200 |
| 4,943,912 | 7/1990 | Aoyama et al. | 395/200 |
| 5,083,265 | 1/1992 | Valiant | 395/800 |
| 5,129,077 | 7/1992 | Hillis | 395/500 |
| 5,222,237 | 6/1993 | Hillis | 395/650 |
| 5,325,464 | 6/1994 | Pechanek et al. | 395/27 |
| 5,339,396 | 8/1994 | Muramatsu et al. | 395/325 |

OTHER PUBLICATIONS

Endrizzi, A "Networks for Parallel Processing One Large Scale", Sep. 14, 1988, pp. 38–44 (IEEE).

Lin et al, "Modeling Control of Distributed Asynchronous Computations", Mar. 23, 1992, pp. 624–631 (IEEE).

*Primary Examiner*—Thomas C. Lee
*Assistant Examiner*—Sang Hui Kim
*Attorney, Agent, or Firm*—Antonelli, Terry, Stout & Kraus, LLP

[57] ABSTRACT

An operation complete signal and a convergence result signal from each processor are transferred to the X-direction interconnection switches, AND of these signals is obtained in switch units in each interconnection switch, the signal is sent out to all the Y-direction interconnection switches through a synchronizing signal relay switch and the like in each relay switch. AND of these signals is obtained in each switch unit in the interconnection switches, and the result thereof is transferred to each processor through each synchronizing signal relay switch. With this, a logical product of an operation complete signal and a logical product of a convergence result signal from all the processors are sent in parallel to all the processors.

40 Claims, 10 Drawing Sheets

FIG. 3

| BIT POSITION OF RTR | CONTROLLED OUTPUT LINE | BIT VALUE | |
|---|---|---|---|
| | | 0 | 1 |
| 1 | 231A | 314A | 414A |
| 2 | 232A | 131A | 414A |
| 3 | 233A | 131A | 314A |

FIG. 4B

| CONTROLLED SELECTER BIT OF RTR | | VALUE | |
|---|---|---|---|
| | | 0 | 1 |
| 1 | 221 | 312A | 412A |
| | 222 | 313A | 413A |
| 2 | 223 | 141A | 412A |
| | 224 | 143A | 413A |
| 3 | 225 | 141A | 312A |
| | 226 | 143A | 313A |

FIG. 4B

| CONTROLLED SELECTER BIT OF RTR | | VALUE | |
|---|---|---|---|
| | | 0 | 1 |
| 1 | 221 | 312A | 412A |
| | 222 | 313A | 413A |
| 2 | 223 | 141A | 412A |
| | 224 | 143A | 413A |
| 3 | 225 | 141A | 312A |
| | 226 | 143A | 313A |

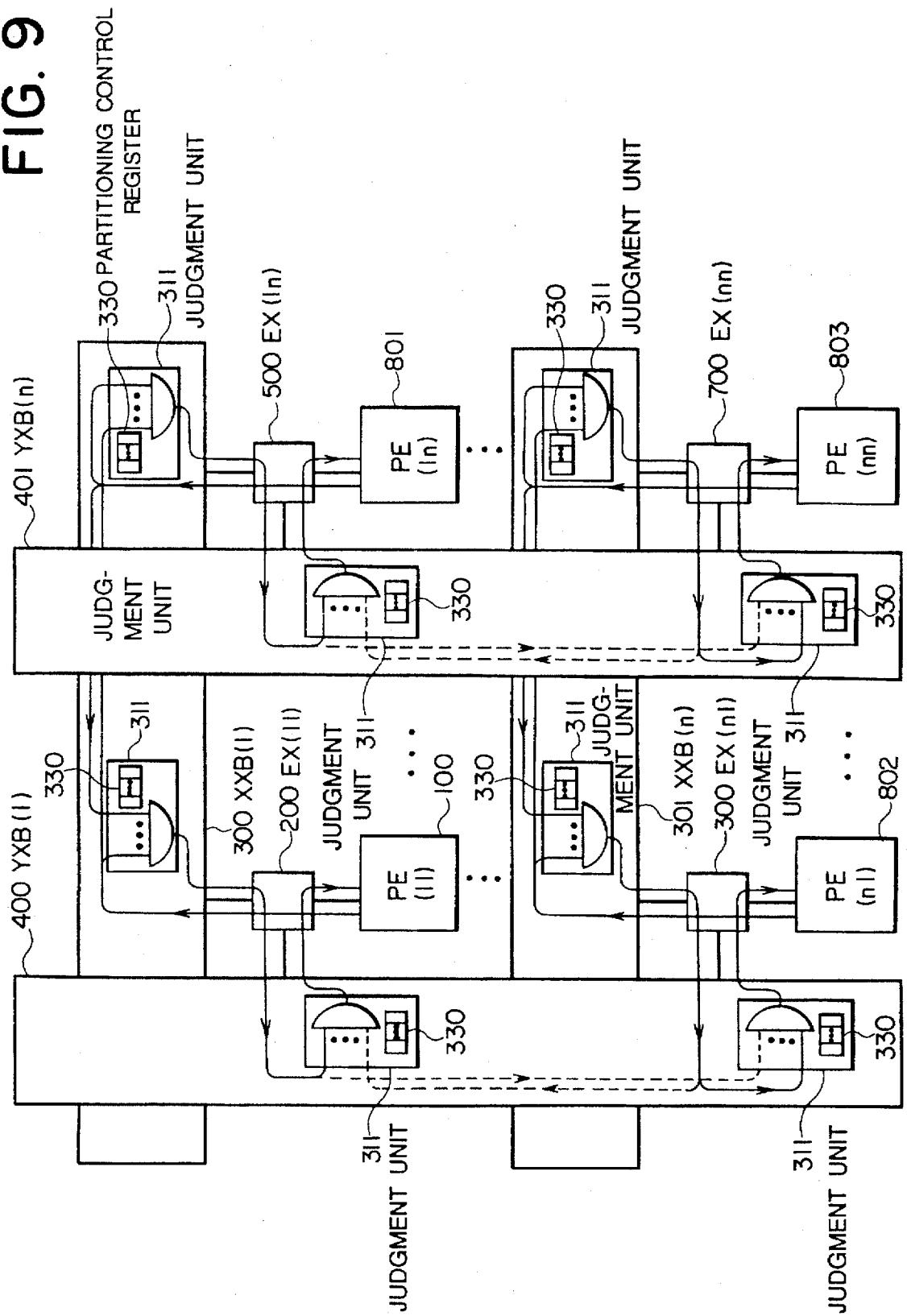

PARALLEL COMPUTING SYSTEM FOR SYNCHRONIZING PROCESSORS BY USING PARTIAL SWITCH CIRCUITS FOR BROADCASTING MESSAGES AFTER RECEIVING SYNCHRONIZATION SIGNALS AND JUDGING SYNCHRONIZATION THEREOF

BACKGROUND OF THE INVENTION

The present invention relates to a parallel computer capable of performing logical operation of synchronizing signals outputted from respective processors of a parallel computer at a high speed and a network therefor.

When a certain physical phenomenon is analyzed numerically using a computer, a partial differential equation governing the physical phenomenon is first discretized for approximation. A method for solving linear equations, which are obtained by giving initial conditions and boundary conditions, by using an iterative solution is well known in general. In the iterative solution, the arithmetic operations including solving, detection of a convergence error of solution values and procedures of convergence judgment are iterated until the convergence error satisfies an allowable error range.

In a parallel computer, the operational processes described above are distributed among respective processors and executed in parallel, and it is determined whether the operational processes are to be repeated again or not from the results of convergence determination by all the processors when all operational processes in respective processors are completed. When all the processors are converged, the processes are completed at that point, and when there is even one non-converged processor, the operational processes are iterated again. Accordingly, in a parallel computer, a completion judgment function for judging that operational processes of all the processors have been completed, and a convergence judgment function for performing the overall convergence judgment from the results of convergence judgments generated in respective processors at a point of time when the operational processes on all the processors are completed and for informing the results to all the processors are required.

As a prior art for realizing the completion judgment function and the convergence judgment function described above, an approach stated in "PAX computer", pp. 52–60 and pp. 85–86 written by Tsutomu Hoshino and published by Ohm Company may be mentioned. In this approach, all the processors are connected to an open collector bus provided separately from a signal line for message transfer among processors. Further, each processor outputs a synchronizing code to the bus, and a synchronization is obtained by confirming that all the processors output the same synchronizing code. Thus, the completion judgment function is realized. Similarly, each processor outputs the convergence judgment results to the bus, and all the processors confirm the results of a logical product generated on the bus, thereby to realize the convergence judgment function mentioned above.

In the approach stated in the prior art described above, a wired logical function on an open collector bus is employed. As a result, there is such a problem that the load capacity of the bus becomes larger and delay time also becomes longer when this conventional system is applied to a large-scale system.

Further, when all processors are partitioned into several groups and an operation mode in which different user jobs are allocated to respective groups and executed, what is called multijob environment, is going to be realized, a bus having a bit width of the number of partition of the processors becomes necessary as a signal line for sending a synchronizing code for completion judgment or convergence judgment described above.

SUMMARY OF THE INVENTION

It is an object of the present invention to provide a network capable of performing logical operation on a synchronizing signal from each processor at a high speed and transferring the results to respective processors.

It is another object of the present invention to provide a network in which, when the processors are partitioned into groups, the logical operation described above can be performed in respective groups.

In order to solve the above-mentioned subject, a parallel computer of the present invention comprises:

a plurality of processors;

switch-circuits for transferring a plurality of messages among the plurality of processors; and signal processing circuits for applying a predetermined processing to a plurality of specific signals outputted from the plurality of processors, respectively, and outputting the results of processing to the plurality of processors in parallel; wherein:

each of the switch circuits has a plurality of input terminals and a plurality of output terminals, and comprises a plurality of partial switch circuits for transferring a plurality of messages inputted from a plurality of input terminals to a plurality of output terminals in parallel, respectively;

the plurality of partial switch circuits are connected mutually and to the plurality of processors so that a plurality of messages sent out from some processors are transferred to other processors determined by respective messages;

each of the signal processing circuits comprises a plurality of partial processing circuits provided corresponding to one of the plurality of partial switch circuits, respectively;

each partial processing circuit applies the predetermined processing to a plurality of specific signals inputted from a plurality of input terminals provided corresponding to a plurality of input terminals of corresponding switch circuits, respectively, and outputs the results to a plurality of output terminals provided corresponding to a plurality of output terminals of the corresponding switch circuit as specific signals; and the plurality of partial processing circuits are connected mutually in a connection relationship same as the interconnection relationship among a plurality of partial switch circuits corresponding to each of the partial processing circuits, and connected further to the plurality of processors in the connection relationship same as the connection relationship among the plurality of partial processing circuits and the plurality of processors.

In a more preferable mode of the present invention, the plurality of processors comprise a plurality of processor groups, and each of partial processing circuits includes a mask circuit for masking the signals except specific signals outputted from the same processor group or signals obtained by processing these specific signals among the signals inputted from the input terminals.

BRIEF DESCRIPTION OF THE DRAWINGS

FIG. 3 shows a control method by a routing control register of a message relay switch in the first embodiment and the second embodiment of the present invention;

FIGS. 4A and 4B show a structure of a synchronizing signal relay switch and a control method thereof by means of a routing control register in the first embodiment and the second embodiment of the present invention;

FIG. 5 shows a structure of a parallel computer in the second embodiment of the present invention;

FIG. 9 shows a flow of a synchronizing signal in the parallel computer shown in FIG. 5.

DESCRIPTION OF THE PREFERRED EMBODIMENTS

The First Embodiment

Figure 1:
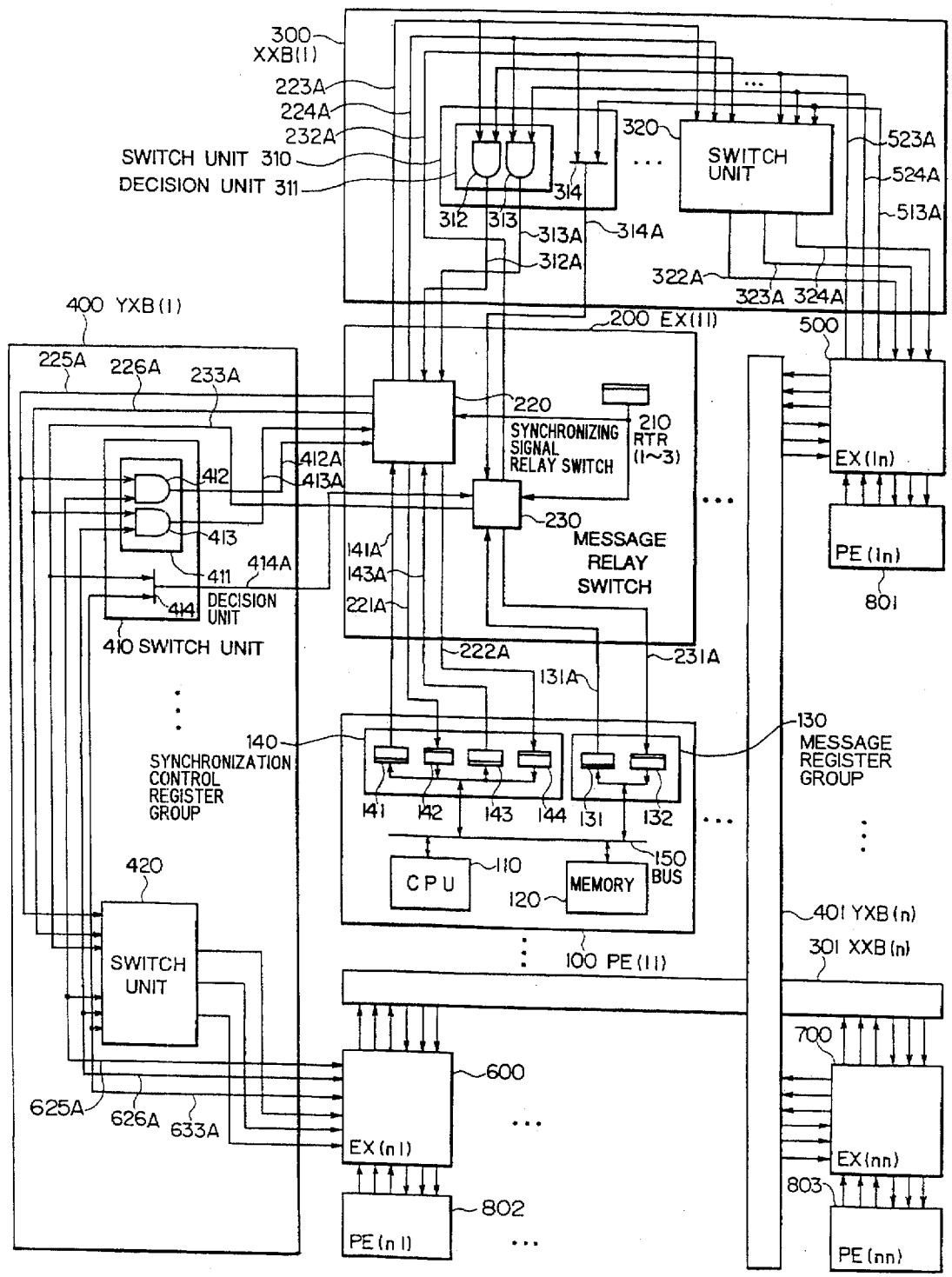
FIG. 1 shows a structure of a parallel computer in the first embodiment of the present invention.

FIG. 1 shows a structure of a parallel computer in the first embodiment of the present invention. The present embodiment shows a parallel computer in which a plurality of processors (hereinafter referred to as PEs) such as 100, 801, 802 and 803 are connected to a plurality of X-direction interconnection switches such as 300 and 301 and also connected to a plurality of Y-direction interconnection switches such as 400 and 401. Each PE is connected to one X-direction interconnection switch and one Y-direction crossbar switch through a relay switch such as 200, 500, 600 or 700 provided corresponding to each of these PEs. A network itself constituted by using a plurality of interconnection switches and relay switches as described above is well known. See JP-A-01-131950 for instance. Discussing in more detail, one address at a lattice point in a two-dimensional space is allocated to each PE in this kind of network. Each X-direction interconnection switch is connected to the processor groups which have the same y-coordinate value and the different x-coordinate values. Similarly, Each Y-direction interconnection switch is connected to the processor groups which have the same x-coordinate value and the different y-coordinate values. Of course, the network concept can be applied to a space in three dimensions or more.

In FIG. 1, reference numerals 100, 801, 802 and 803 represent partial processors PE(11), PE(1n), PE(n1) and PE(nn) included in a parallel computer. Their internal structures are the same. A CPU 110 executes a program. A memory 120 holds program and data. A synchronizing control register group 140 comprises four pieces of registers 141, 142, 143 and 144, and is used for the completion judgment and the convergence judgment. A message register group 130 comprises two pieces of registers 131 and 132, and is used for transmission-reception reception of messages between processors. A bus 150 represents a signal line used for data transfer among the memory 120 and registers 141, 142, 143, 144, 131 and 132.

Reference numerals 200, 500, 600 and 700 represent partial relay switches EX(11), EX(1n), EX(n1) and EX(nn), each connected to corresponding one X-direction interconnection switch, one Y-direction interconnection switch, and the processors. Their internal structures are the same. Each relay switch comprises a 3-bit routing control register RTR (1-3) 210, a synchronizing signal relay switch 220 and a message relay switch 230. The message relay switch 230 switches messages sent from a corresponding processor such as PE(11), a X-direction crossbar switch such as XXB(1) 300 and a Y-direction crossbar switch such as YXB(1) 400 and sends the message to appropriate destinations. Similarly, the synchronizing signal relay switch 220 switches signal lines related to completion judgment and convergence judgment in accordance with the control of a routing control register (RTR) 210 and sends the message to appropriate destinations. The routing control register RTR(1-3) 210 performs the control of transfer sequence of the synchronizing signal lines and the control of transfer sequence for sending broadcast messages to all processors. The value of the routing control register RTR(1-3) 210 is set to an appropriate value in advance by a service processor and the like before starting the execution of the program.

300 and 301 represent some X-direction interconnection switches XXB(1) and XXB(n). Their internal structures are the same. Each X-direction interconnection switch comprises switch units 310, . . . , 320 having the same structure provided corresponding to one input/output signal line pair of the switch. Each switch unit such as 310 comprises a selector 314 for selecting one of the messages sent from all relay switches connected to the interconnection switch and a decision element 311 characteristic of the present invention. The judgment element 311 comprises an AND circuit 312 for judging the completion and an AND circuit 313 for judging the convergence based on the synchronizing signals sent from all relay switches connected to the interconnection switch. Besides, a circuit for controlling each selector 314 is not illustrated for the sake of simplicity.

400 and 401 represent some Y-direction interconnection switches YXB(1) and YXB(n). Their internal structures are the same. Each Y-direction interconnection switch has the same structure as the X-direction interconnection switch. Namely, the Y-direction interconnection switch comprises switch units 410, . . . , 420 having the same structure provided corresponding to relay switches connected to the switch. Each switch unit comprises a selector 414 for selecting one of messages sent from all the relay switches connected to the interconnection switch and a judgment element 411 characteristic of the present invention. A control circuit of the selector 414 is not illustrated for the sake of simplicity. The judgment element 411 comprises an AND circuit 412 for generating a logical product for judging the completion and an AND circuit 413 for generating a logical product for judging the convergence.

Since respective input signal lines of each X-direction interconnection switch are connected to the selectors 314 of all switch units 310, . . . , 320, these selectors constitute crossbar switches.

It is a feature of the present embodiment that the judgment element 311 is provided corresponding to each selector included in each X-direction interconnection switch.

Similarly, it is a feature of the present embodiment that each Y-direction interconnection switch 400 or 401 also includes the judgment element 411 provided corresponding to each selector constituting a crossbar switch.

Furthermore, in the present embodiment, the interconnection relationship among a plurality of interconnection switches and the connection relationship among these interconnection switches and the processors for transferring synchronizing signals are the same as the interconnection relationship among a plurality of interconnection switches and the connection relationship among these interconnection switches and the processors for transferring the messages.

In a parallel computer in the present embodiment, ordinary one to one message among processors is transferred in procedures stated hereunder. Namely, in FIG. 1, the CPU 110 of a sending processor, e.g., PE(11) sets a message having the number of a receiving processor, e.g. PE(nn), to the register 131 in the message register group 130 through the bus 150. The coordinates of a lattice point in a two-dimensional space allocated to the receiving processor are used as the number of this receiving processor. The message is sent to the message relay switch 230 of the relay switch EX(11) 200 through the signal line 131A.

FIG. 3 shows the relationship among respective bits of the routing control register RTR 210 in the relay switch EX(11) 200 and output signal lines controlled in the message relay switch 230, and the relationship among the values of respective bits RTR (1-3) and the input signal lines for being connected to the output signal lines. The bit RTR(1) controls the output signal line 231A, RTR(2) controls the output signal line 232A, and RTR(3) controls the output signal line 233A, respectively. When the value of RTR(1) is zero, the input signal line 314A is selected and connected to the output signal line 231A, and when the value is one, the input signal line 414A is selected and connected thereto. RTR(2) and RTR(3) work as same as shown in the figure. In the present embodiment, it is assumed that values 1, 0 and 1 have been set to the routing control registers RTR(1-3) in advance. Namely, a message sent out to the line 131A from PE(11) is transferred to the interconnection switch 300 in the X-direction through the line 232A. On the other hand, a message sent out to the line 314A from this interconnection switch 300 is transferred to the interconnection switch 400 in the Y-direction through the line 233A, and the message transferred to the line 414A from this switch 400 is transferred to PE(11) through the line 231A.

Referring now to FIG. 1, in the present embodiment, a message sent out from PE(11) is transferred to the Y-direction interconnection switch YXB(1) 400 in the message relay switch 230.

The message is sent to all the switch units 310 thru 320 in the interconnection switch XXB(1) through the signal line 232A or 233A. Then, the control circuit (not illustrated) in the switch unit (320 in this example), which is provided corresponding to the relay switch (EX(1n) in this example) connected to the Y-direction interconnection switch (YXB (n) in this example) connected to the processor which is designated by a receiving processor number added to the message, makes the selector 314 in the switch unit select the message based on the receiving processor number in this message, and sends the message to a corresponding relay switch (500 in this example) through the output signal line (324A in this example).

In a relay switch 500, this message is transferred further to the Y-direction interconnection switch 401.

This message is sent to all switch units 410 in the Y-direction interconnection switch YXB(n), selected by the selector in the switch unit 410, which is corresponding to the relay switch (EX(nn) in this example) connected to the processor having the same Y-coordinate value as that of the receiving processor number, and transferred to the processor PE(nn) through the relay switch EX(nn). The message is transferred to the receiving processor through the shortest route in such a manner described above.

Since the present invention bears resemblance to message broadcasting, a method for broadcasting a message will be described before explaining a method for judging the completion and the convergence.

Broadcasting of a message to all the processors is performed as follows. A broadcast message sent out from a sending processor, e.g. PE(11) 100, is sent to the message relay switch 230 of the relay switch EX(11) 200 through the line 131A, outputted to the output signal line 232A, and sent to the Y-direction interconnection switch XXB(1) 300.

In the interconnection switch XXB(1) 300, the message is sent to the switch units 310 thru 320. Then, when a control circuits (not illustrated) provided in each switch unit recognizes that the message is a broadcast message, the selector 314 in the switch unit selects the broadcast message. As a result, the selectors in all switch circuits select this message, and transfer the message to the relay switches EX(11) 200 thru EX(1n) 500 through the signal lines 314A thru 324A.

In the message relay switch 230 in these relay switches, this broadcast message is outputted to the signal line 232A in accordance with the control of the routing control register RTR(3). Similar operation is also performed in other relay switches. As a result, this broadcast message is sent to all Y-direction interconnection switches YXB(1) 400 to YXB (n) 401.

Also, in each Y-direction interconnection switch YXB(1) 400 to which the message is transferred, the broadcast message is selected by selectors 414 in all switch units, and transferred to the relay switches EX(11) 200 thru EX(n1) 600 through signal lines 414A thru 424 by the operation similar to that of the interconnection switch XXB(1) 300 in the horizontal direction. Similar operation is also performed in other interconnection switches in the longitudinal direction.

In the message relay switch 200, a message sent from the signal line 414A is outputted to PE(11) through the signal line 231A in accordance with the control of the routing control register RTR(1). Similar operation is also performed in other relay switches.

In the processor (11) 100, the message sent through the signal line 231A is set to the register 132, and written into the memory 120 through the bus 150. By the fact that the message is written into a memories in all processors, it is possible to broadcast the same message to all processor including the sending processor.

The foregoing concludes the description of the operation of sending a message.

Figure 2:
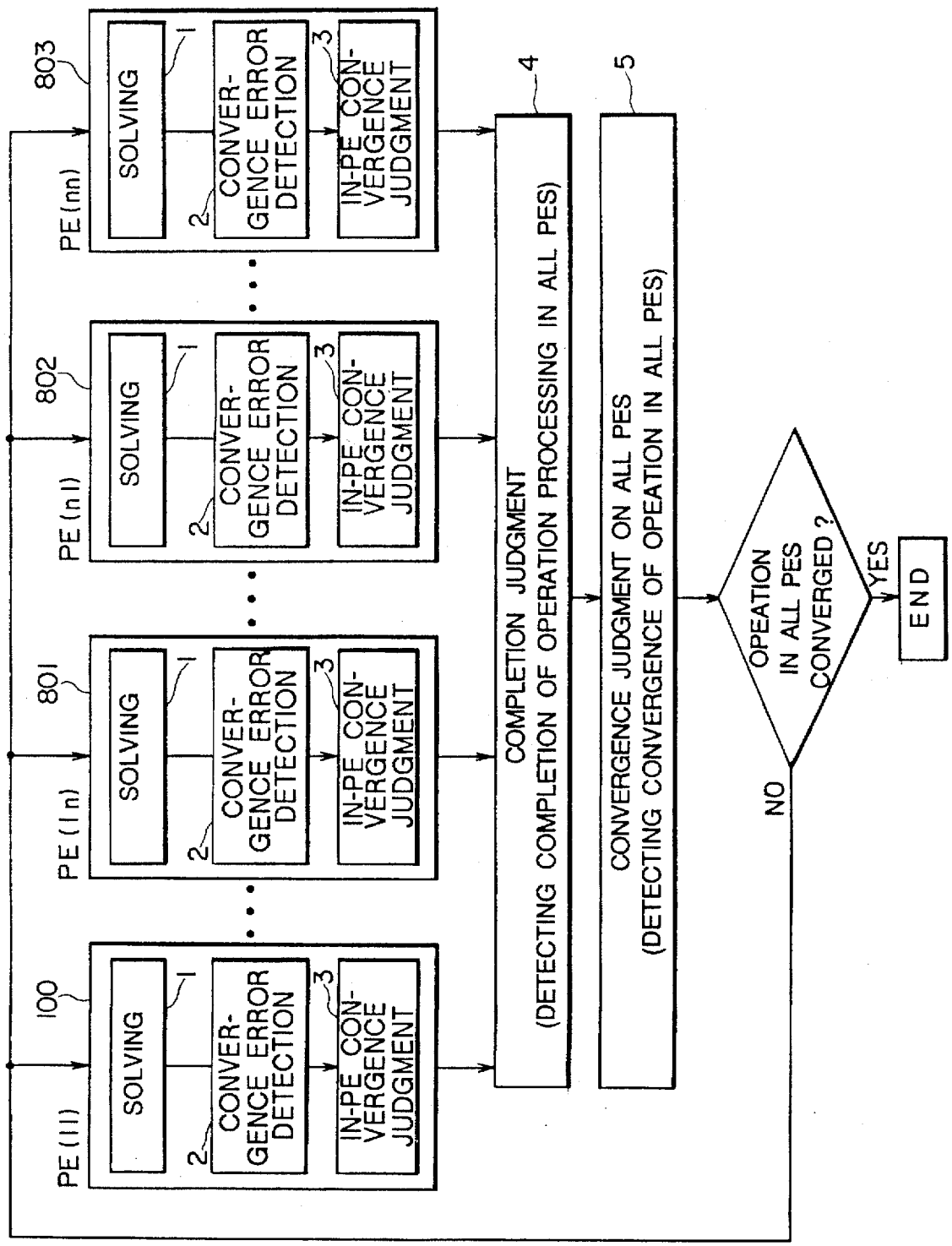
FIG. 2 shows the outline of procedures of typical processing when numerical computation is performed using a parallel computer.

FIG. 2 shows an outline of typical processing procedures in case that numerical computation is performed using a parallel computer. Respective processors shown as PE(11), PE(1n), PE(n1) and PE(nn) in the figure execute operational processing independently. Namely, an approximate solution of a linear equation system is obtained (solving . . . 1), and the approximate solution obtained in the previous operational processing is compared with the approximate solution obtained in operational processing this time (convergence error detection . . . 2). Then, convergence is judged whether all of comparison results of the approximate solution obtained by the comparison falls within the range of predetermined convergence judgment error (in-PE convergence judgment . . . 3). After the convergence judgment is performed in the processor, completion of operational processings in all processors is waited (completion judgment . . . 4). Then, after operational processings are completed, overall convergence judgment (overall PE convergence judgment . . . 5) is made so as to determine whether operational processing is to be iterated again or not. 1, 2 and 3 in the figure indicate software processings executed by a program, and 4 and 5 indicate hardware processings executed by exclusive hardwares of the-processor.

Next, procedures for performing the completion judgment and the overall PE convergence judgment among the processing described above will be described with reference to FIG. 1

The CPU 110 reads data from the memory 120 through the bus 150 so as to perform computation and obtain an approximate solution in each PE. After obtaining the convergence error by comparing the result with the approximate solution obtained in the previous operational processing which is also stored in the memory 120, the convergence is judged whether the result falls within an allowable range of convergence errors. When convergence judgment is finished, operational processing is completed and the CPU 110 sets a value 1 in a synchronizing signal output register 141 through the bus 150 as an operation complete signal which shows that operational processing has been completed. At the same time, if all results of convergence judgment fall within the range of a convergence error, a value 1 is similarly set in a convergence result output register 143 through the bus 150 as a convergence result signal, and 0 is set therein otherwise. Thereafter, the CPU 110 monitors a synchronizing signal input register 142 and waits until it shows a value 1. The values of the synchronizing signal output register 141 and the convergence result output register 143 are sent to the relay switch EX(11) 200 through the signal line 141A and the signal line 143A, respectively. The same procedures are applied to other processors.

The outline of procedures for performing the completion judgment and the overall PE convergence judgment among processings stated above will be described with reference to FIG. 7.

Figure 7:
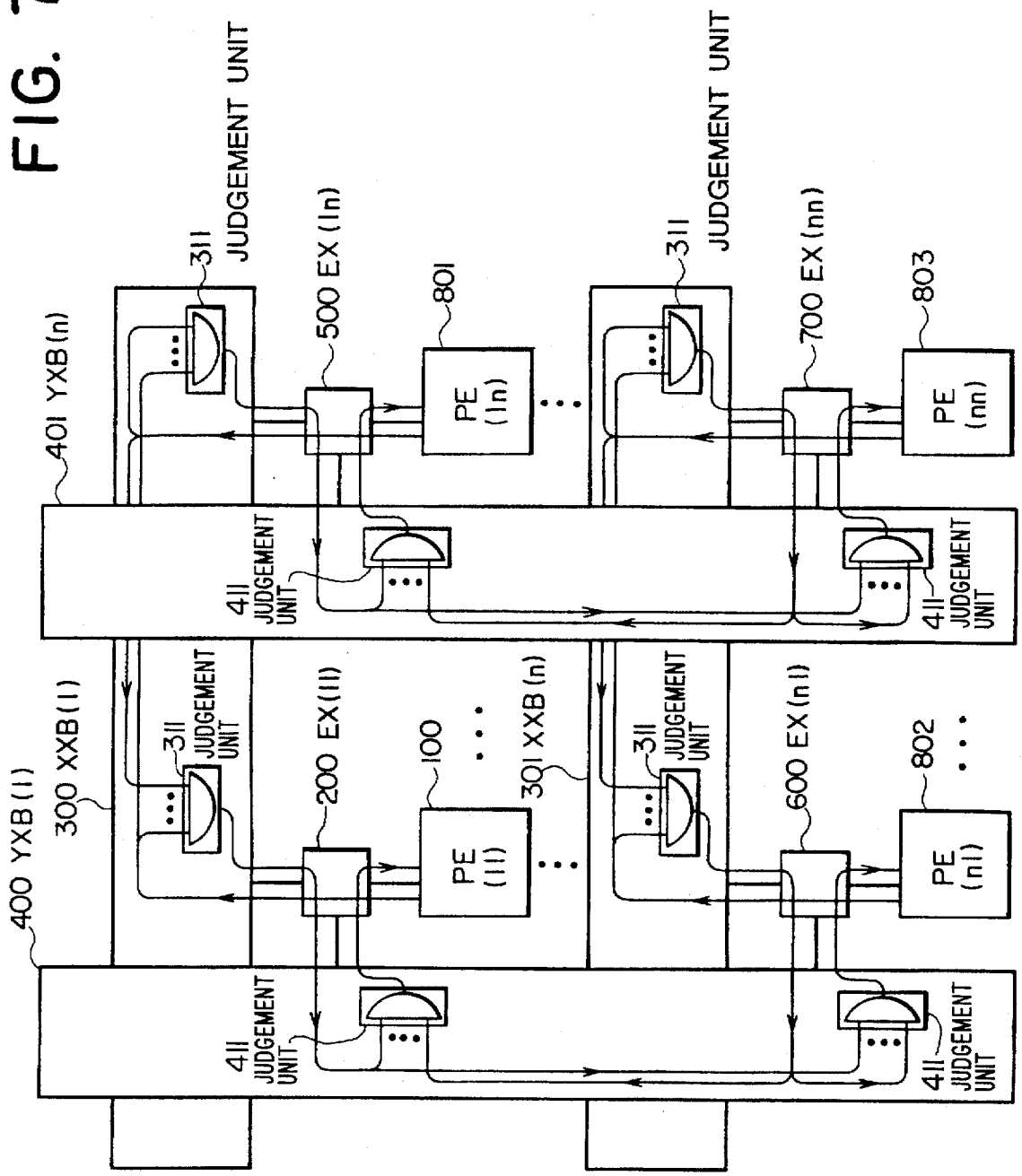
FIG. 7 shows a flow of a synchronizing signal in the parallel computer shown in FIG. 1.

FIG. 7 shows a state that signals for giving completion judgment and overall convergence judgment outputted from the processors PE(11) to PE(nn) (collected in one line in the figure) are transmitted in the relay switch EX(11) thru the interconnection switches similarly to the broadcast message. The signal line from the processor PE(11) is connected to the horizontal interconnection switch XXB(1) through the relay switch EX(11). In the interconnection switch XXB(1), a logical product of signals sent from the processors PE(11) to PE(1n) is obtained by the AND circuit in the judgment element 311, and the completion judgment and the convergence judgment of the processors PE(11) to PE(1n) are performed. The results thereof are transferred in parallel to the relay switches EX(11) to EX(1n) as illustrated. Furthermore, in the relay switches EX(11) to EX(1n), the information is relayed so as to be sent to the Y-direction interconnection switch. In other Y-direction interconnection switches, the completion judgment and the convergence judgment of the processors connected in the X-direction are also performed. In the Y-direction interconnection switch YXB(1), the results of the completion judgment and the convergence judgment of the processors arranged in the X-direction which are sent from the relay switches EX(11) to EX(n1) are inputted, and the logical products are obtained by the AND circuits in the respective judgment elements 411, and the completion judgment and the convergence judgment of all the processors are performed. The results thereof are transferred in parallel to the relay switches EX(11) to EX(n1). Other Y-direction interconnection switches perform similar operations. By transferring the results to the processors by means of EX(11) and all the relay switches, all processors are able to catch the results of completion judgments and convergence judgments of all processors at the same time.

Next, the detailed operation will be described with reference to FIG. 4.

Figure 4A:
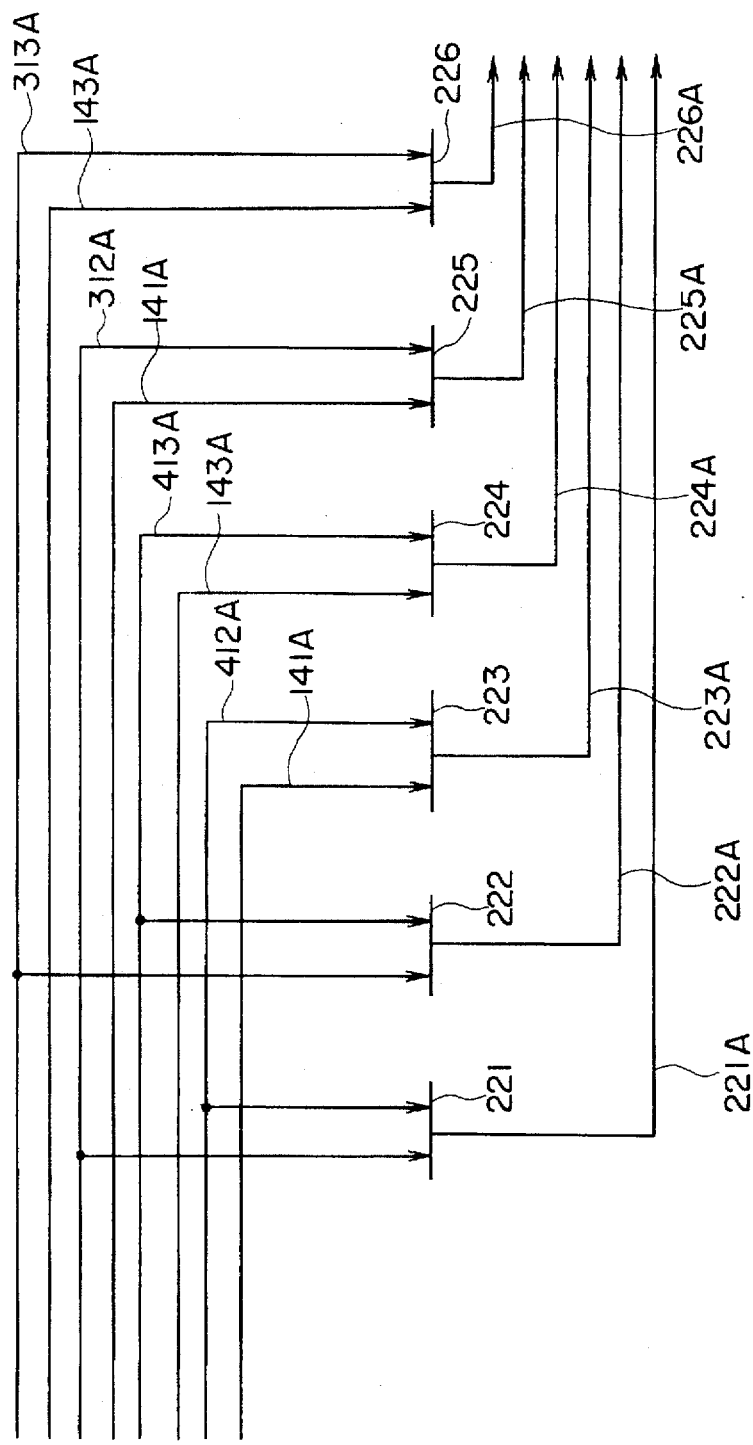

FIG. 4A shows a structure of a synchronizing signal relay switch 220, and FIG. 4B shows a control by the routing control register RTR(1-3) 210, 221, 222, 223, 224, 225 and 226 are 2-input selectors, respectively. RTR(1) controls the selectors 221 and 222, RTR(2) controls the selectors 223 and 224, and RTR(3) controls the selectors 225 and 226. When the value of RTR(1) is zero, an input signal line 312A is selected by the selector 221, and an input signal line 313A is selected by the selector 222 as outputs. When the value is 1, an input signal line 412A is selected by the selector 221, and an input signal line 413A is selected by the selector 222 as outputs. The same is applied to RTR(2) and RTR(3) as illustrated.

As described previously, it is assumed in the present embodiment that values 1, 0 and 1 are set in advance in the routing control registers RTR(1-3) 210. Accordingly, an operation completion signal and a convergence result signal sent from PE(11) through signal lines 141A and 143A are selected by the selectors 223 and 224 in accordance with the control shown in FIG. 3 when the value 0 is set in RTR(2), and are sent to the X-direction interconnection switch XXB (1) through signal lines 223A and 224A, respectively. The same is applied to all other relay switches.

Two signals sent from each relay switch are both sent to all switch circuits 310, . . . , 320 in the interconnection switch.

When operational processing has been completed in all processors PE(11) to PE(1n), all values sent from the selector 223 (FIG. 4) of EX(11) to EX(1n) connected to the same X-direction interconnection switch 300 become 1, the logical products are obtained by AND circuits 312 in all switch units in XXB(1) 300, and values 1 are outputted in parallel as operation complete signals after partial operations are performed on EX(11) to EX(1n). Further, in case operational processings has been converged in all processors PE(11) to PE(1n) at this time, all values of the convergence result signals sent from the selectors 224 of EX(11) to EX(1n) become 1, the logical products are generated in AND circuits 313 in all switch units in XXB(1) 300, and values 1, or values 0 when including any not 1, are outputted in parallel as the convergence result signal after partial operations are performed on EX(11) to EX(1n).

In EX(11) 200, the operation control signal and the convergence result signal after partial operations which are sent from XXB(1) 300 through signal lines 312A and 313A are selected by selectors 225 and 226 in accordance with the control shown in FIG. 4 when a value 1 is set in RTR(3), and are sent to YXB(1) 400 through signal lines 225A and 226B. Similar operations is also performed in all other relay switches.

In the interconnection switch 200, the signal supplied thereto is also sent to all the switch units 310, . . . , 320 in the switch 200.

The operation complete signal sent from the selector 225 shows whether operational processings of all processors in one horizontal line have been completed or not. In case operational processings have been completed in all processors PE(11) to PE(nn), all values sent from the selector 225 of EX(11) to EX(n1) become 1, logical products are generated by AND circuits 412 in YXB(1) 400, and values 1 are outputted in parallel to EX(11) to EX(n1). Further, when operational processings are converged in all processors in one horizontal line at that time, all values sent from selectors 226 of EX(11) to EX(n1) become 1, logical products are generated by AND circuits 413 in YXB(1) 400, and values 1, or values 0 when including not 1, are outputted in parallel to EX(11) to EX(n1). The same is also applied to all other longitudinal interconnection switches.

In EX(11), the information sent from YXB(1) 400 through signal lines 412A and 413A is selected by the selectors 221 and 222 in accordance with the control shown in FIG. 3 when a value 1 is set in RTR(1), and sent to PE(11) 100 through signal lines 221A and 222A. The same is also applied to all other relay switches.

When operational processings in all processors are completed, the value sent from the selector 221 of EX(11) becomes 1, and a value 1 is set in a synchronizing signal input register 142. The CPU 110, which has been monitoring the synchronizing signal input register 142 by a program, reads a convergence result input register 144 for seeing the convergence judgment results of all processors when it recognizes that the synchronizing signal input register 142 shows a value 1. At this time, a value 1 is set in the convergence result input register 144 in case the operational processing results of all processors are converged and a value 0 is set otherwise depending on the value sent from the selector 222 of EX(11) 200 through the signal line 222A. Thus, when the convergence result input register 144 is read out, it is possible to determine in an instant whether the operational processings are to be iterated again or the operational processings are to be finished. In case the operational processings are to be iterated again, following operational processings are started after the synchronizing signal output register 141, the convergence result output register 142, the synchronizing signal input register 143 and the convergence result input register are cleared to values 0. Processing in the processor described above is performed in all the processors.

As described above, in all X-direction interconnection switches, logical products among operation complete signals and among the convergence result signals related to all processors in one line in the X-direction are generated. Then, in all the Y-direction interconnection switches, logical products among signals generated by the X-direction interconnection switches are further generated in the Y-direction, and the results are sent to respective processors. With this, it becomes possible for all processors to obtain logical products of the information outputted by all processors at the same time.

According to the present invention, it is possible to realize that the switch units in the interconnection switch use the same structure and all the relay switches use the same structure by not only increasing in speed due to the difference of capabilities of signal lines, but also employing the same topology as the signal lines for message transfer among processors to the signal lines for completion judgment and convergence judgment.

The Second Embodiment

In a second embodiment, the processors are partitioned into a plurality of groups, and only processors belonging to one of groups is used instead of all processors so as to perform similar computation.

Figure 8:
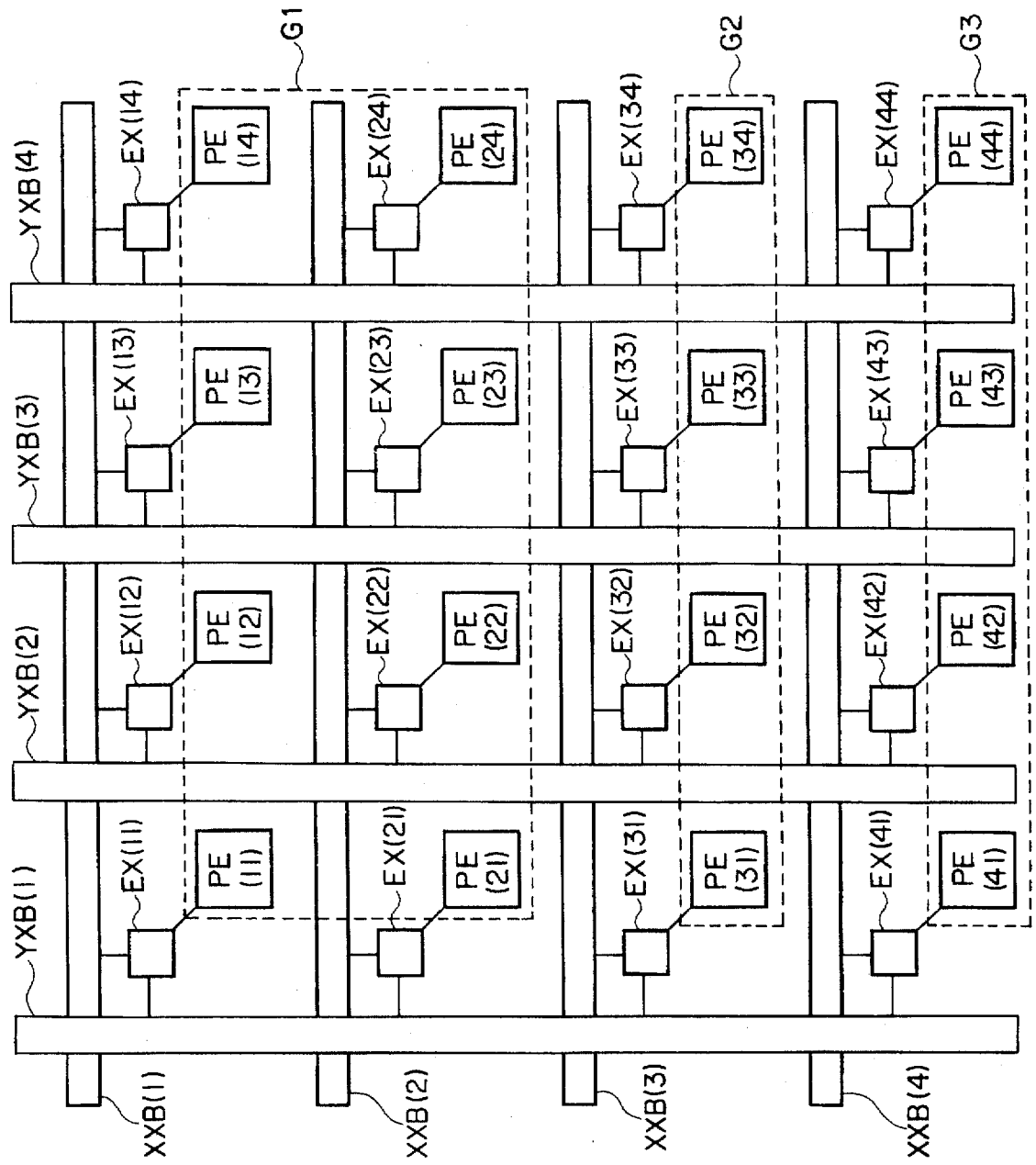
FIG. 8 shows a group partitioning in the parallel computer shown in FIG. 5.

FIG. 8 shows a parallel computer partitioned into three processor groups G1, G2 and G3, when four in the X-direction by four in the Y-direction processors are provided.

The processors belonging to the same group execute interrelated programs in parallel. In case of different groups, mutually independent programs are executed. Thus, when a computer partitioned into groups, it is also required that completion judgments and overall PE convergence judgments are performed in processors belonging to the same group.

FIG. 5 shows a structure of a parallel computer in a second embodiment. FIG. 5 shows the same structures as those shown in FIG. 1 except the structures of judging elements 311 and 411. Accordingly, only the judging elements 311 and 411 which have different structures will be described.

Figure 6:
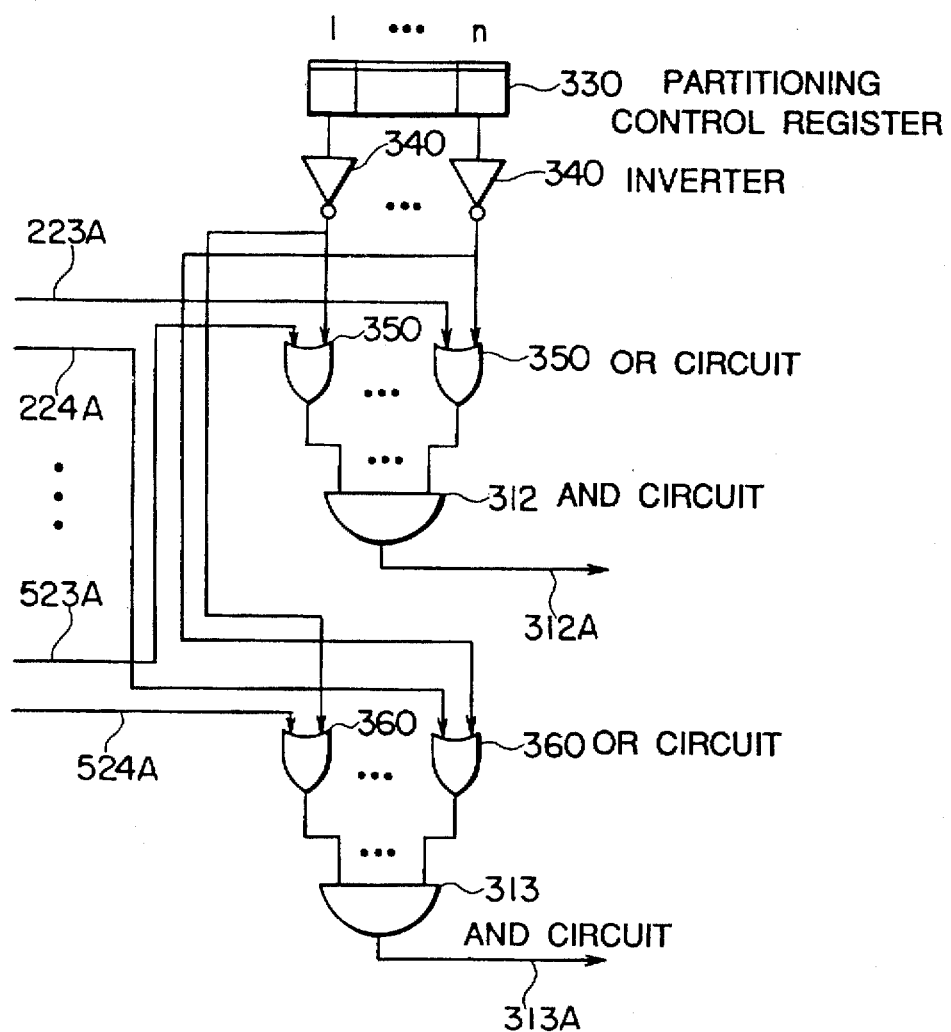
FIG. 6 shows a structure inside a partial AND circuit 200 shown in FIG. 5.

FIG. 6 shows an inside structure of the judging element 311. A partitioning control register 330 indicates the processors belonging to a group, to which PE connected to a synchronizing signal relay switch 220 connected to the judgment element (hereinafter referred to as PE corresponding to the switch or the judgment element), including its own processor. Namely, bits 1 to n in the partitioning control register 330 correspond to PE(11) to PE(1n), respectively, thereby to show that a processor indicated by setting a value 1 in the corresponding bit belongs to the same group as the PE corresponding to the judgment element.

An inverter 340 generates a negation of a value set in the partitioning control register 330, and an OR circuit 350 generates an logical sum of the output of the inverter 340 and a value sent from selectors 223 of EX(11) to EX(1n) through a signal line 223A thru 523A. An AND circuit 312 receives the output of the OR circuits 350 in units of n bits as illustrated and generates a logical product. An OR circuit 360 generates a logical sum of the output of the inverter 340 and a value sent from the selectors 224 in EX(11) to EX(1n) through signal lines 224A thru 524A. An AND circuit 313 receives the output of the OR circuit 360 in units of n bits as illustrated and generates a logical product. These inverters 340 and the OR circuits 350 and 360 form a circuit for masking signals through 223A–523A and 224A–524A inputted to the AND circuits 312 and 313 in accordance with the value of the register 330.

When a value 1 is set in the partitioning control register 330, i.e., it means that the partitioning control register belongs to the same group, the output of the inverter 340 shows a value 0, and the values sent from the selectors 223 of EX(11) to EX(1n) through the signal lines 223A thru 523A are reflected directly on the output of the OR circuit 350. Further, when a value 0 is set, i.e., it means that the partitioning control register 330 does not belong to the same group, the output of the inverter 340 shows a value 1, and the output of the OR circuit 350 always shows a value 1. With this, it becomes possible to select only the values from processors belonging to the same group and input the values to the AND circuit 312, thereby to generate a logical product. Similarly, it becomes possible to select only the values from the processors belonging to the same group and input this value to the AND circuit 313, thus generating a logical product.

In the judgment element of the switch unit 320, a partitioning control register corresponds to PE(1n), and processors belonging to the group to which PE(1n) belongs are clearly indicated including its own processor.

It is possible to partition PE(11) to PE(1n) into any plurality of groups by using partitioning control register in the X-direction interconnection switch XXB(1) 300.

The internal structure of the judgment element 411 is similar to that of the judgment element 311, and the signal lines 223A, 224A, 523A, 524A, 312A and 313A are replaced by signal lines 225A, 226A, 625A, 626A, 412A and 413A, respectively. With this, it is possible to similarly partition PE(11) to PE(n1) into any plurality of groups by using partitioning control register in the Y-direction interconnection switch YXB(1) 400.

As a result, signals shown with dotted lines which are propagated from other groups are disregarded as illustrated in FIG. 9.

As described above, by setting partitioning control registers in the judgment elements of respective interconnection switches to the appropriate values corresponding to partition groups, it is possible to partition the processors in one-dimensional direction arranged in the X- or Y-direction into any plurality of groups, and select only the signals outputted from the processors belonging to the group so as to perform the completion judgment and the convergence judgment. Further, it is self-explanatory that, by setting appropriate values to the routing control registers RTR(1 to 3) described in the embodiment 1, it is also possible to constitute a two-dimensional processor groups by combining these registers.

Besides, an invention in which processors are partitioned into a plurality of groups and it is made possible to transfer broadcast messages in respective groups has been applied by the present applicant (JP-A-3-180734). In this application, an embodiment in which a route indication bit register is used as a register for indicating a route when a broadcast message is relayed by a relay switch has been shown. It is easy to makes up the second embodiment of the present invention by modifying the embodiment of JP-A-3-180734 so as to execute this partial broadcast. In this case, the route indication bit register used in the previous application can be common to the routing control register in the second embodiment of the present application.

A case of a two-dimensional structure has been described in two embodiments described above. Further, a structure having even a larger number of dimensions can be realized easily by making the relay switch structure conform thereto.

Furthermore, it is also possible to use an OR circuit in place of an AND circuit used in respective judgment elements. In this case, the signal having a value 0 is outputted when each processor has completed the execution of a program and judged that the result thereof have been converged.

Moreover, it is also possible to modify two embodiments described above as stated below.

For example, in order to detect completion of execution of any one processor of all processors, the AND gates in the judgment elements in the two embodiments described above are replaced with OR gates and an execution complete signal is outputted by each processor when it completes the execution.

Furthermore, in some cases, depending on application programs, a logical sum, an exclusive-OR, or a mean value, the maximum value, the minimum value and the like are generated by using the values outputted from respective processors when the operation processings are completed in all processors. In these cases, the methods to obtain these results are as follows. All processors set the values to corresponding resisters (143 in FIG.), and the values are calculated in one kind of the circuits for generating a logical sum, an exclusive-OR, a mean Value, the maximum value, the minimum value or the like instead of the AND circuits 313 and 413. Thus a logical sum, an exclusive-OR, a mean value, the maximum value, the minimum value etc. in the values outputted from all processors can be set to the resister 144.

According to the present invention, it is possible to realize a system in which the load capacity of signal lines is not increased and the delay time is short even in case the present invention is applied to a large-scale system.

According to another invention in the present application, it is possible to process a signal such as a synchronizing signal in respective groups after partitioning the processors into the groups.

What is claimed is:

1. A parallel computer comprising:
    a plurality of processors;
    a switch circuit for transferring a plurality of messages among said plurality of processors;
    a signal processing circuit for applying a predetermined processing to a plurality of specific signals of a first kind respectively outputted from said plurality of processors, and outputting specific signals of a second kind each indicative of a common result of the processing to said plurality of processors in parallel;
    said switch circuit comprising a plurality of partial switch circuits, each thereof having a plurality of input terminals and a plurality of output terminals and transferring a plurality of messages inputted from the plurality of input terminals to the plurality of output terminals in parallel;
    said plurality of partial switch circuits being connected mutually and to said plurality of processors so as to transfer a plurality of messages respectively sent from some of said processors to others of said processors determined by respective messages;
    each of said plurality of partial switch circuits including judgement means for judging whether synchronization exists between said processors based on synchronization signals sent from said processors;
    said plurality of partial switch circuits transfer said messages based on an output of said judgement means;
    each of said signal processing circuits comprising a plurality of partial processing circuits each thereof being provided corresponding to one of said plurality of partial switch circuits, having a plurality of input terminals and a plurality of output terminals; and
    applying said predetermined processing to a plurality of specific signals respectively inputted from the plurality of input terminals and outputting specific signals each indicative of a common result of the processing to the plurality of output terminals in parallel as specific signals;
    said plurality of input terminals of each partial processing circuit being provided corresponding to a plurality of input terminals of one of said switch circuits corresponding to said each partial processing circuit and said plurality of output terminals of said each partial processing circuit being provided corresponding to a plurality of output terminals of the corresponding switch circuit;
    said plurality of partial processing circuits being connected to said processors, so that at least first part of said plurality of partial processing circuits receive, in parallel, said plurality of specific signals of a first kind outputted by said processors;
    said plurality of partial processing circuits being further connected to each other, so that at least a second part of said plurality of partial processing circuits receive, in parallel, results of execution of the processing by said first part of said plurality of partial processing circuits to said received plurality of specific signals of the first kind and generate said specific signals of the second kind as result of execution of said processing to said received results; and said plurality of partial processing circuits being further connected to said processors so that said specific signals of the second kind generated by said second part of said plurality of partial processing circuits are provided to said plurality of processors in parallel.

2. A parallel computer according to claim 1, wherein said plurality of partial processing circuits are connected mutually in same connection relationship as interconnection relationship between the plurality of partial switch circuits, and are connected further to said plurality of processors in same connection relationship as connection relationship between said plurality of partial switch circuits and said plurality of processors.

3. A parallel computer according to claim 1, wherein each partial processing circuit comprises a plurality of signal processing circuits corresponding to a plurality of output terminals of .a partial switch circuit corresponding to said each partial processing circuit.

4. A parallel computer according to claim 3, wherein each partial switch circuit includes;

a plurality of selectors, each thereof being provided corresponding to the plurality of output terminals of said each partial switch circuit, and selecting one of a plurality of messages inputted from said plurality of input terminals of said each partial switch circuit; and a control circuit responsive to a message inputted from one of the input terminals for controlling said plurality of selectors as to whether the message is to be selected or not;

wherein each partial processing circuit comprises a plurality of signal processing circuits, each thereof being provided corresponding to one of a plurality of output terminals of said each partial processing circuit, and applying the predetermined processing to a plurality of specific signals inputted from a plurality of input terminals of the corresponding partial switch circuit, and supply a specific signal indicative of a result of the processing to one of the output terminals of said each partial processing circuit corresponding to said each signal processing circuit.

5. A parallel computer according to claim 3, wherein each partial switch circuit comprises a crossbar switch.

6. A parallel computer according to claim 5, wherein:

said plurality of partial switch circuits comprises a plurality of groups of partial switch circuit, said switch circuit included in said parallel computer further includes a plurality of first relay switches, each thereof being provided corresponding to one of said processors and corresponding to a set of partial switch circuits belonging to different partial switch circuit groups and for relaying messages transferred between said corresponding set of partial switch circuits and between one of said corresponding set of partial switch circuits and said corresponding processor; and said signal processing circuit included in said parallel computer further include a plurality of second relay switches, each thereof being provided corresponding to one of said first relay switches, being connected to one of said processors to which the corresponding first relay switch is connected and to one set of partial processing circuits to which the corresponding first relay switch is connected, and relaying specific signals transferred between said one set of partial processing circuits and between one of said one set of partial processing circuits and said one processor.

7. A parallel computer according to claim 5, wherein:

each first relay switch comprises a plurality of selectors for switching connection between one set of partial switch circuits connected to said each first relay switch and connection between said one set of partial switch circuits and one processor connected to said each first relay switch and a register for holding information for controlling the selectors; and each second relay switch comprises a plurality of selectors for switching connection between one set of partial signal processing circuits connected to said second relay switch and connection between said one set of signal processing circuits and one processor connected to said second relay switch and a register for holding information for controlling the selectors.

8. A parallel computer according to claim 1, wherein:

said plurality of partial switch circuits comprises a plurality of groups of partial switch circuit, said switch circuit included in said parallel computer further includes a plurality of first relay switches, each thereof being provided corresponding to one of said processors and corresponding to a set of partial switch circuits belonging to different partial switch circuit groups and for relaying messages transferred between said corresponding set of partial switch circuits and between one of said corresponding set of partial switch circuits and said corresponding processor; and said signal processing circuit included in said parallel computer further include a plurality of second relay switches, each thereof being provided corresponding to one of said first relay switches, being connected to one of said processors to which the corresponding first relay switch is connected and to one set of partial processing circuits to which the corresponding first relay switch is connected, and relaying specific signals transferred between said one set of partial processing circuits and between one of said one set of partial processing circuits and said one processor.

9. A parallel computer according to claim 8, wherein:

each first relay switch comprises a plurality of selectors for switching connection between one set of partial switch circuits connected to said each first relay switch and connection between said one set of partial switch circuits and one processor connected to said each first relay switch and a register for holding information for controlling the selectors; and each second relay switch comprises a plurality of selectors for switching connection between one set of partial signal processing circuits connected to said second relay switch and connection between said one set of signal processing circuits and one processor connected to said second relay switch and a register for holding information for controlling the selectors.

10. A parallel computer according to claim 9, wherein each partial processing circuit comprises a plurality of signal processing circuits corresponding to a plurality of output terminals of a partial switch circuit corresponding to said each partial processing circuit.

11. A parallel computer according to claim 1, wherein:
each processor is given coordinates of one corresponding lattice point in a space having a plurality of dimensions;
said plurality of partial switch circuits comprises a plurality of groups of partial switch circuits, each group being provided corresponding to one of coordinate axis is in said space; and
each partial switch circuit group comprises a plurality of partial switch circuits, each thereof being provided corresponding to one combination of a plurality of combination of coordinate values related to coordinate axes other than one coordinate axis corresponding to the each partial switch circuit group and connecting a group of processors which are given mutually different coordinate values related to the corresponding coordinate axis and are given the corresponding combination of coordinate values related to coordinate axes other than the corresponding coordinate axis, respectively.

12. A parallel computer according to claim 11, wherein each of partial processing circuits comprises a crossbar switch.

13. A parallel computer according to claim 11, wherein each partial processing circuit comprises a plurality of signal processing circuits corresponding to a plurality of output terminals of one of said partial switch circuits corresponding to said each partial processing circuit.

14. A parallel computer according to claim 1, wherein:
said plurality of processors comprise a plurality of groups of processor; and
each partial processing circuit includes a mask circuit for masking signals other than specific signals of the first kind outputted from processors belonging to a same processor group and specific signals of the second kind obtained by processing these specific signals of the first kind, among specific signals inputted from a plurality of input terminals of said each partial processing circuit.

15. A parallel computer according to claim 14, wherein:
each partial processing circuit comprises a plurality of signal processing circuits provided corresponding to a plurality of output terminals of one of the partial switch circuits corresponding to said each partial processing circuit; and
said mask circuit provided in said each partial processing circuit comprise a plurality of mask circuits provided corresponding to said plurality of signal processing circuits provided in said each partial processing circuit.

16. A parallel computer according to claim 15, wherein:
each processor is given coordinates of a corresponding one of lattice points in a space having a plurality of dimensions;
each processor group comprises a plurality of processors provided with coordinates of lattice points in a corresponding one of a plurality of rectangular parallelepiped areas of said space which are not overlapped one upon another;
each partial switch circuit comprises a plurality of groups of partial switch circuits, each group provided corresponding to one of coordinate axes of said space;
each partial switch circuit group comprises a plurality of partial switch circuits, each thereof being provided corresponding to one combination of a plurality of combination of coordinate values related to coordinate axes other than one of the coordinate axes corresponding to said each partial switch circuit group, and connecting a group of processors which are given mutually different coordinate values of related to the corresponding coordinate axes, and are given the corresponding combination of coordinate values related to the coordinate axes other than the corresponding coordinate axis; and
said plurality of mask circuits provided in each partial processing circuit include registers provided corresponding to said plurality of signal processing circuits provided in a partial switch circuit corresponding to said each partial processing circuit and holding the information showing whether specific signals inputted from a plurality of input terminals of said each partial processing circuit are to be masked or not.

17. A parallel computer according to claim 16, wherein each partial switch circuit comprises a crossbar switch.

18. A parallel computer according to claim 17, wherein:
said switch circuit included in said parallel computer further includes a plurality of first relay switches, each thereof being provided corresponding to one of said processors and corresponding to a set of partial switch circuits belonging to different partial switch circuit groups and for relaying messages transferred between said corresponding set of partial switch circuits and between one of said corresponding set of partial switch circuits and said corresponding processor; and
said signal processing circuit included in said parallel computer further include a plurality of second relay switches, each thereof being provided corresponding to one of said first relay switches, being connected to one of said processors to which the corresponding first relay switch is connected and to one set of partial processing circuits to which the corresponding first relay switch is connected, and relaying specific signals transferred between said one set of partial processing circuits and between one of said one set of partial processing circuits and said one processor.

19. A parallel computer according to claim 18, wherein:
each first relay switch comprises
a plurality of selectors for switching connection between one set of partial switch circuits connected to said each first relay switch and connection between said one set of partial switch circuits and one processor connected to said each first relay switch and
a register for holding information for controlling the selectors; and
each second relay switch comprises
a plurality of selectors for switching connection between one set of partial signal processing circuits connected to said second relay switch and connection between said one set of signal processing circuits and one processor connected to said second relay switch and
a register for holding information for controlling the selectors.

20. A parallel computer according to claim 14, wherein:
said switch circuit included in said parallel computer further includes a plurality of first relay switches, each thereof being provided corresponding to one of said processors and corresponding to a set of partial switch circuits belonging to different partial switch circuit groups and for relaying messages transferred between said corresponding set of partial switch circuits and between one of said corresponding set of partial switch circuits and said corresponding processor; and
said signal processing circuit included in said parallel computer further include a plurality of second relay switches, each thereof being provided corresponding to one of said first relay switches, being connected to one of said processors to which the corresponding first relay switch is connected and to one set of partial processing circuits to which the corresponding first relay switch is connected, and relaying specific signals transferred between said one set of partial processing circuits and between one of said one set of partial processing circuits and said one processor.

21. A parallel computer according to claim 20, wherein:

each first relay switch comprises a plurality of selectors for switching connection between one set of partial switch circuits connected to said each first relay switch and connection between said one set of partial switch circuits and one processor connected to said each first relay switch and a register for holding information for controlling the selectors; and each second relay switch comprises a plurality of selectors for switching connection between one set of partial signal processing circuits connected to said second relay switch and connection between said one set of signal processing circuits and one processor connected to said second relay switch and a register for holding information for controlling the selectors.

22. A parallel computer according to claim 20, wherein:

each partial processing circuit comprises a plurality of signal processing circuits provided corresponding to a plurality of output terminals of one of the partial switch circuits corresponding to said each partial processing circuit; and said mask circuit provided in said each partial processing circuit comprise a plurality of mask circuits provided corresponding to said plurality of signal processing circuits provided in said each partial processing circuit.

23. A parallel computer according to claim 14, wherein:

each processor is given coordinates of a corresponding one of lattice points in a space having a plurality of dimensions;

each processor group comprises a plurality of processors provided with coordinates of lattice points in a corresponding one of a plurality of rectangular parallelepiped areas of said space which are not overlapped one upon another;

each partial switch circuit comprises a plurality of groups of partial switch circuits, each group provided corresponding to one of coordinate axes of said space;

each partial switch circuit group comprises a plurality of partial switch circuits, each thereof being provided corresponding to one combination of a plurality of combination of coordinate values related to coordinate axes other than one of the coordinate axes corresponding to said each partial switch circuit group, and connecting a group of processors which are given mutually different coordinate values of related to the corresponding coordinate axes, and are given the corresponding combination of coordinate values related to the coordinate axes other than the corresponding coordinate axis; and said plurality of mask circuits provided in each partial processing circuit include registers provided corresponding to said plurality of signal processing circuits provided in a partial switch circuit corresponding to said each partial processing circuit and holding the information showing whether specific signals inputted from a plurality of input terminals of said each partial processing circuit are to be masked or not.

24. A parallel computer according to claim 23, wherein each partial switch circuit comprise a crossbar switch.

25. A parallel computer according to claim 23, wherein:

each partial processing circuit comprises a plurality of signal processing circuits provided corresponding to a plurality of output terminals of one of the partial switch circuits corresponding to said each partial processing circuit; and said mask circuit provided in said each partial processing circuit comprise a plurality of mask circuits provided corresponding to said plurality of signal processing circuits provided in said each partial processing circuit.

26. A parallel computer according to claim 1, wherein each partial processing circuit comprises an AND circuit to which a plurality of specific signals are inputted.

27. A parallel computer according to claim 1, wherein each partial processing circuit comprises an OR circuit to which a plurality of specific signals are inputted.

28. A parallel computer according to claim 1, wherein each partial processing circuit comprises an exclusive-OR circuit to which a plurality of specific signals are inputted.

29. A parallel computer according to claim 1, wherein each processor includes means for outputting a signal showing completion of execution of a program therein as said specific signal.

30. A parallel computer according to claim 1, wherein each processor includes means for outputting a signal showing a result of convergence judgment of execution of a program therein, as said specific signal.

31. A parallel computer according to claim 1, wherein each processor includes means for outputting a signal showing completion of execution of a program therein and a signal showing a result of convergence judgment of execution of a program therein.

32. A parallel computer according to claim 29, wherein each partial processing circuit comprises an AND circuit to which a plurality of signals each showing completion of execution inputted from a plurality of input terminals of said each partial processing circuit are inputted.

33. A parallel computer according to claim 30, wherein each partial processing circuit comprises an AND circuit to which a plurality of signals each showing a result of convergence judgment inputted from a plurality of input terminals of said each partial processing circuit are inputted.

34. A parallel computer according to claim 32, wherein each partial processing circuit comprises an AND circuit to which a plurality of signals each showing completion of execution inputted from a plurality of input terminals of said each partial processing circuit are inputted and an AND circuit to which a plurality of signals each showing a result of convergence judgment are inputted from the plurality of terminals.

35. A parallel computer according to claim 1, wherein:

each processor includes means for outputting result data obtained as a result of execution of a program therein; and each partial processing circuit comprises an arithmetic operation circuit to which a plurality of data inputted from a plurality of input terminals of said each partial processing circuit are inputted.

36. A parallel computer according to claim 35, wherein said arithmetic operation circuit comprises a circuit for obtaining a sum total of said plurality of inputted data.

37. A parallel computer according to claim 35, wherein said arithmetic operation circuit comprises a circuit for obtaining a mean value of said plurality of inputted data.

38. A parallel computer according to claim 35, wherein said arithmetic operation circuit comprises a circuit for obtaining a maximum value of said plurality of inputted data.

39. A parallel computer according to claim 35, wherein said arithmetic operation circuit comprises a circuit for obtaining a minimum value of said plurality of inputted data.

40. A parallel computer comprising:

(a) a plurality of processors; and (b) switch circuits for connecting said plurality of processors with each other, transferring one-to-one messages and broadcast messages among them, applying a predetermined processing to a plurality of specific signals outputted from said plurality of processors, and transferring a result of the processing to said plurality of processors;

wherein said switch circuit comprises a plurality of partial switch circuits;

each of said plurality of partial switch circuits including judgement means for judging whether synchronization exists between said processors based on synchronization signals sent from said processors;

said plurality of partial switch circuits transfer said messages and broadcast messages based on an output of said judgement means;

each partial switch circuit includes:

(i) a plurality of message input terminals, a plurality of message output terminals, a plurality of specific signal input terminals provided corresponding to said plurality of message input terminals, and a plurality of specific signal output terminals provided corresponding to said plurality of message output terminals;

(ii) a circuit for transferring a plurality of messages inputted from a plurality of message input terminals to a plurality of message output terminals determined by respective messages in parallel; and (iii) a signal processing circuit for applying said predetermined processing to a plurality of specific signals inputted from said plurality of specific signal input terminals and outputting specific signals indicative of a common result of the processing in parallel to said plurality of specific signal output terminals, wherein a plurality of message input terminals and a plurality of message output terminals of said plurality of partial switch circuits are connected to one another or to said plurality of processors so that a message sent out of one of said processors is transferred to another of said processors determined by that message;

wherein each of said plurality of specific signal input terminals of each partial switch circuit is connected to a specific signal output terminal corresponding to a message output terminal of another partial switch circuit, to which a message input terminal corresponding to the specific signal input terminal is connected, or to one of said processors, and each of said plurality of specific signal output terminals of each partial switch circuit is connected to a specific signal input terminal corresponding to a message input terminal of another partial switch circuit or one of said processors to which a corresponding message output terminal of the specific signal output terminal is connected.

* * * * *